United States Patent
Ho

(10) Patent No.: US 9,898,550 B2
(45) Date of Patent: Feb. 20, 2018

(54) METHODS FOR CONTROLLING ANTENNAS AND APPARATUSES USING THE SAME

(71) Applicant: Wistron NeWeb Corp., Hsinchu (TW)

(72) Inventor: Yung-Fa Ho, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 274 days.

(21) Appl. No.: 14/859,875

(22) Filed: Sep. 21, 2015

(65) Prior Publication Data

US 2016/0095130 A1    Mar. 31, 2016

(30) Foreign Application Priority Data

Sep. 26, 2014    (TW) .............................. 103133448 A

(51) Int. Cl.
| | |
|---|---|
| *H04B 7/06* | (2006.01) |
| *G06F 17/30* | (2006.01) |
| *H04B 7/0417* | (2017.01) |
| *H04W 88/08* | (2009.01) |

(52) U.S. Cl.
CPC ..... *G06F 17/30946* (2013.01); *H04B 7/0417* (2013.01); *H04B 7/0695* (2013.01); *H04B 7/063* (2013.01); *H04W 88/08* (2013.01)

(58) Field of Classification Search
None
See application file for complete search history.

(56) References Cited

U.S. PATENT DOCUMENTS

| | | |
|---|---|---|
| 2005/0286440 A1 | 12/2005 | Strutt et al. |
| 2006/0079220 A1 | 4/2006 | Cha et al. |
| 2009/0146894 A1 | 6/2009 | Drexler et al. |
| 2013/0120200 A1 | 5/2013 | Desclos et al. |
| 2013/0177055 A1* | 7/2013 | Huang ................. H01Q 1/246 375/224 |

* cited by examiner

*Primary Examiner* — Alex Skpirnikov
(74) *Attorney, Agent, or Firm* — Muncy, Geissler, Olds & Lowe, P.C.

(57) ABSTRACT

A method for controlling antennas, performed by a virtual tunneling processor of a wireless access point, is provided and contains at least the following steps. Obtaining a plurality of first signal quality indices associated with a connecting device by respectively detecting the plurality of first signal quality indices by a plurality of antenna patterns, selecting a plurality of best antenna patterns as a plurality of antenna-pattern candidates according to the first signal quality indices, obtaining a plurality of second signal quality indices associated with the connecting device by respectively detecting the plurality of second signal quality indices by the antenna-pattern candidates, and storing the second signal quality indices in a database.

19 Claims, 5 Drawing Sheets

METHODS FOR CONTROLLING ANTENNAS AND APPARATUSES USING THE SAME

CROSS REFERENCE TO RELATED APPLICATIONS

This Application claims priority of Taiwan Patent Application No. 103133448, filed on Sep. 26 2014, the entirety of which is incorporated by reference herein.

BACKGROUND

Technical Field

The present invention relates to data communications, and in particular, it relates to methods for controlling antennas and apparatuses using the same.

Description of the Related Art

WiFi devices are typically equipped with a MIMO (Multi-Input Multi-Output) antenna architecture with an omni-directional antenna to transmit RF (Radio Frequency) signals. Co-channel interference is often produced in a user environment that includes terminals and wireless access points, leading to a performance downgrade. Typically, in order to reduce co-channel interference, a wireless access point may be used to increase the transmission power to transmit data. However, the co-channel interference becomes worse due to such self-optimization. Therefore, there is a need for methods for arranging and selecting antenna patterns, namely configurations, of producing different radiation patterns and apparatuses applying the method to decrease co-channel interferences and avoid enhancing connection quality of most devices in the user environment.

SUMMARY OF THE INVENTION

An embodiment of a method for controlling antennas, performed by a virtual tunneling processor of a wireless access point, is provided and contains at least the following steps: obtaining first signal quality indices associated with a connecting device, which are detected by their respective antenna patterns: selecting the best antenna patterns as antenna-pattern candidates according to the first signal quality indices; obtaining second signal quality indices associated with the connecting device, which are detected by the antenna-pattern candidates, respectively; and storing the second signal quality indices in a database.

An embodiment of another method for controlling antennas, performed by a virtual tunneling processor of a wireless access point, is introduced to contain at least the following steps: receiving a packet to be transmitted to a connecting device; providing a database that stores first signal quality indices associated with the connecting device, which are the latest ones obtained and stores second signal quality indices for the best antenna patterns of the connecting device; selecting one best antenna pattern by comparing the first signal quality indices with the second signal quality indices; adjusting a control logic circuit of a steering antenna to transmit the packet to the connecting device.

An embodiment of an apparatus for controlling antennas is introduced to contain at least a database and a virtual tunneling processor. The virtual tunneling processor, coupled to the database, obtains first signal quality indices associated with a connecting device, which are detected by their respective antenna patterns; selects the best antenna patterns as antenna-pattern candidates according to the first signal quality indices; obtains second signal quality indices associated with the connecting device, which are detected by the antenna-pattern candidates, respectively; and stores the second signal quality indices in the database.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

This description is made for the purpose of illustrating the general principles of the invention and should not be taken in a limiting sense. The scope of the invention is best determined by reference to the appended claims.

Figure 1:
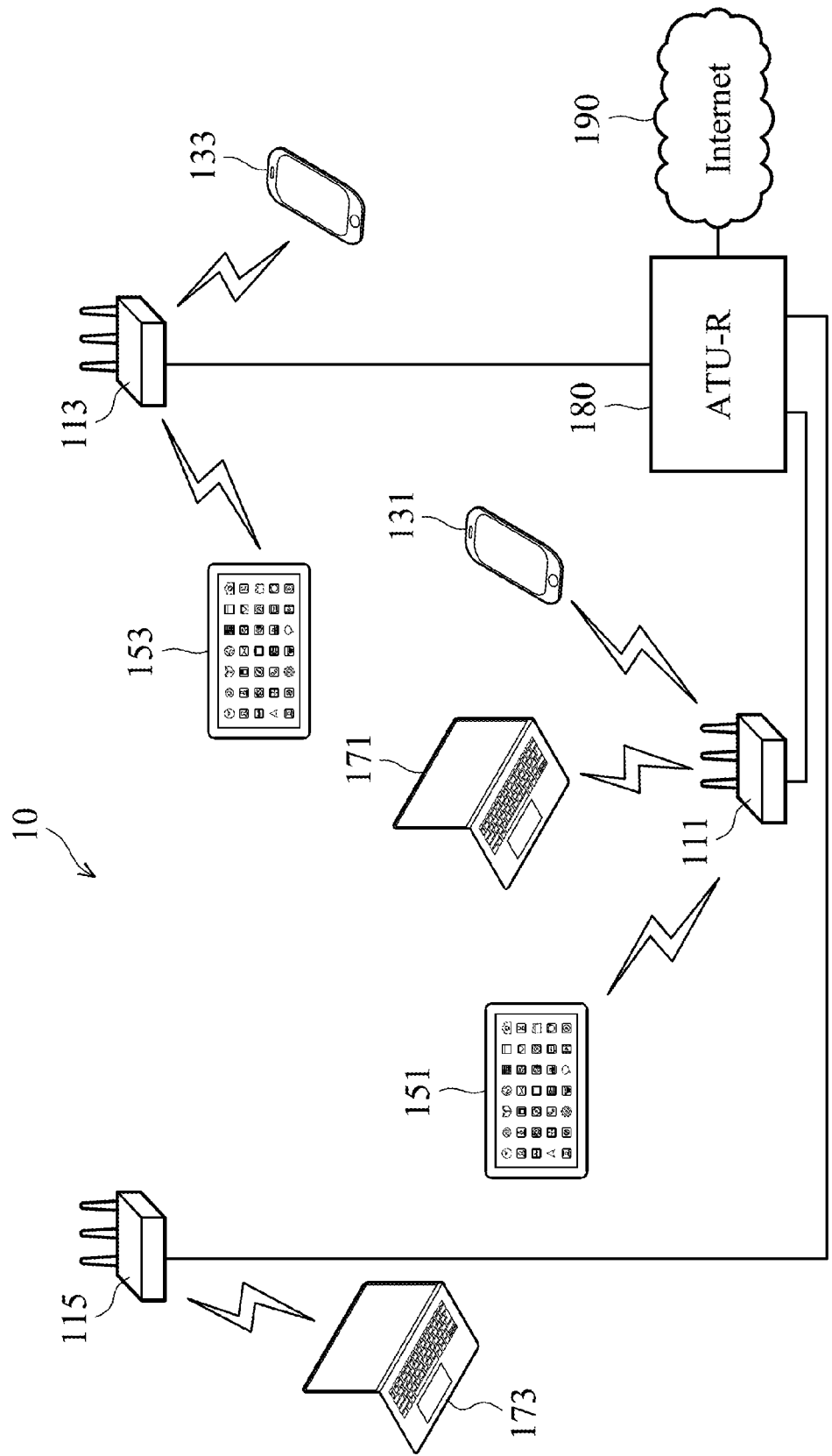
FIG. 1 is a schematic diagram illustrating a user environment according to an embodiment of the invention.

Embodiments of the invention are practiced in a user environment including terminals and wireless access points. FIG. 1 is a schematic diagram illustrating a user environment according to an embodiment of the invention. The user environment 10 contains wireless access points 111, 113 and 115 installed in a particular region, such as a lecture hall, a cinema, a library, a recording studio, an assembly hall, or others. The wireless access points 111, 113 and 115 connect to the Internet 190 by an ATU-R (ADSL Transceiver Unit Remote) 130. The wireless access point 111 establishes a connection with a mobile phone 131, a tablet computer 151 or a notebook computer 171 and provides the services of transmitting data packets to the Internet 190 and receiving data packets from the Internet 190. The wireless access point 113 establishes a connection with a mobile phone 133 and a tablet computer 153, and the wireless access point 115 establishes a connection with a notebook computer 173. Regarding a process for establishing a connection, the mobile phone 131 discovers the wireless access point 111 via a built-in WiFi module when moving into signal coverage of the wireless access point 111, and uses the wireless broadband Internet service provided by the telecommunications operator after completing the registration and authentication mechanism. The mobile phone 131 requests an AAA (Authentication, Authorization and Accounting) server for connecting to the Internet 190 using the EAP-SIM (Extensible Authentication Protocol for Subscriber Identity Module). After completion of registration and authentication, packets sent from the mobile phone 131 can pass through the ATU-R 180, the telecommunications network (not shown) and the gateway (not shown) to the Internet 190.

Figure 2:
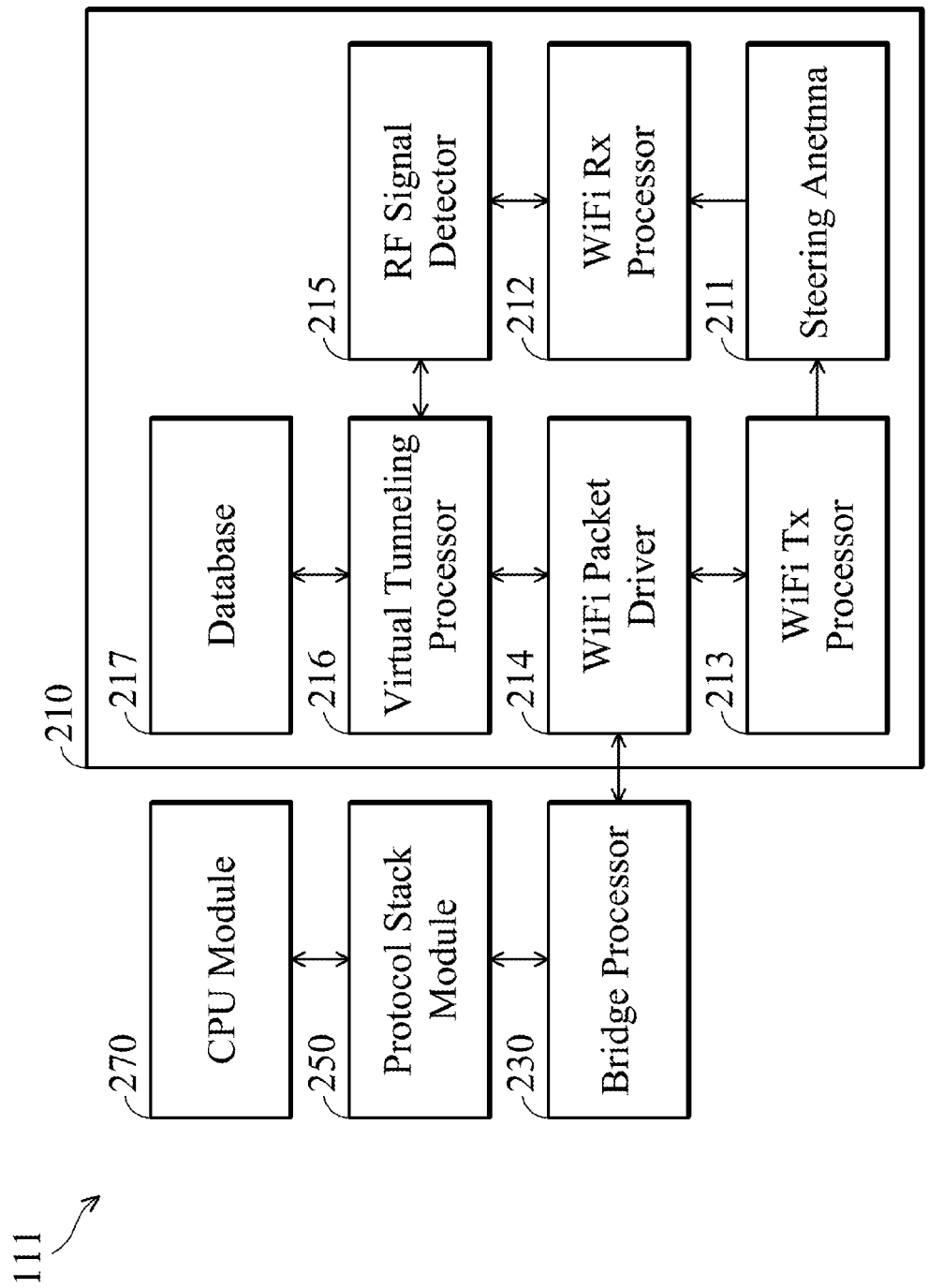
FIG. 2 is the architecture of a WiFi packet processing system according to an embodiment of the invention.

FIG. 2 is the architecture of a WiFi packet processing system according to an embodiment of the invention. The system architecture may be practiced in the wireless access point 111 and, in order to achieve the purpose of reducing the co-channel interference with the other wireless access points, a WiFi module 210 may be equipped with an RF signal detector 215, a virtual tunneling processor 216 and a database 217. The RF signal processor 215 may check the extent of co-channel interference according to information feedback from a WiFi Rx processor 212, such as IFS (Interframe Space), SINR (Signal-to-Interference-plus-Noise Ratio), or others. The WiFi Rx processor 212 may scan surrounding WiFi devices, such as the wireless access points 113 and 115, the mobile phone 133, the tablet computer 153, the notebook computer 173, etc., to observe IFS or SINR. Or, the virtual tunneling processor 216 may know the extent of co-channel interference by obtaining IFS used in packet transmissions from a WiFi packet driver 214. IFS is the period a wireless node has to wait before it is allowed to transmit its next frame. SIFS (Short Interframe Space) is used for the highest priority transmissions enabling wireless nodes with this type of information to access the radio link first, such as a RTS (Ready To Send), a CTS (Clear To Send), or an ACK (Acknowledgement). PIFS (PCF Interframe Space) is the waiting time before a wireless node has been allowed to transmit its next frame while performing a PCF (Point Coordination Function). DIFS (DCF Interframe Space) is the waiting time before a wireless node has been allowed to transmit its next frame while performing a DCF (Distributed Coordination function). If an error occurs in a previously received frame, the waiting time of transmitting the next frame will be extended by applying an EIFS (Extended Interframe Space) instead of applying a DIFS. The period of time in order from the shortest to the longest IFS intervals are SIFS, PIFS, DIFS and EIFS.

The database 217 resident in a non-volatile storage device records patterns (configurations) of antennas and information regarding RF parameters for the detected WiFi devices. Specifically, for each connecting device, such as the mobile phone 131, the tablet computer 151 and the notebook computer 171, the database 217 records the most recently obtained signal quality indices, such as SINR, IFS, RSSI (Received Signal Strength Indication), PER (Packet Error Rate), etc., and criteria for selecting antenna patterns, which are associated with different signal quality indices. In addition, for the surrounding wireless nodes, such as the wireless access point 113 and 115, the mobile phone 133, the tablet computer 153, the notebook computer 173, etc., the database 217 records the most recently obtained signal quality indices, such as SINR, IFS, etc. The database 217 may contain exemplary information regarding the most recently obtained signal quality indices as shown in Table 1.

TABLE 1

| WiFi Device | Current SINR | Current IFS | Current RSSI | Current PER |
|---|---|---|---|---|
| MAC1 | SINR_cur | IFS_cur | RSSI_cur | PER_cur |
| MAC2 | SINR_cur | IFS_cur | RSSI_cur | PER_cur |
| MAC3 | SINR_cur | IFS_cur | RSSI_cur | PER_cur |

Each of the connecting devices or detected wireless nodes may be identified by MAC (Media Access Control) addresses denoted as "MAC1", "MAC2" and "MAC3". For each connecting device or detected wireless node, four fields may be used to record and denote the most recently obtained SINR, IFS, RSSI and PER as "SINR_cur", "IFS_cur", "RSSI_cur" and "PER_cur", respectively. It should be noted that, for each connecting device or wireless node, the database 217 may store one or more signal quality indices. The database 217 may contain exemplary information shown in Table 2, as being used to provide the virtual tunneling processor 216 with criteria for selecting antenna patterning accordance with different signal quality indices.

TABLE 2

| WiFi Device | First Antenna Pattern | Second Antenna Pattern | Third Antenna Pattern |
|---|---|---|---|
| MAC1 | BP_1 | BP_2 | BP_3 |
|  | SINR_1 | SINR_2 | SINR_3 |
|  | IFS_1 | IFS_2 | IFS_3 |
|  | RSSI_1 | RSSI_2 | RSSI_3 |
|  | PER_1 | PER_2 | PER_3 |
| MAC2 | BP_1 | BP_2 | BP_3 |
|  | SINR_1 | SINR_2 | SINR_3 |
|  | IFS_1 | IFS_2 | IFS_3 |
|  | RSSI_1 | RSSI_2 | RSSI_3 |
|  | PER_1 | PER_2 | PER_3 |
| MAC3 | BP_1 | BP_2 | BP_3 |
|  | SINR_1 | SINR_2 | SINR_3 |
|  | IFS_1 | IFS_2 | IFS_3 |
|  | RSSI_1 | RSSI_2 | RSSI_3 |
|  | PER_1 | PER_2 | PER_3 |

Similarly, connecting device and detected wireless nodes may be identified by MAC addresses denoted as "MAC1", "MAC2" and "MAC3". Table 2 further describes how each WiFi device connecting to the wireless access point 111 may select one of the three antenna patterns, where the control parameters of the antenna patterns are recorded in fields "BP_1", "BP_2" and "BP_3". The field "SINR_1" records a reference value of SINR associated with the first antenna pattern. The field "IFS_1" records a specified IFS associated with the first antenna pattern. The field "RSSI_1" records a reference value of RSSI associated with the first antenna pattern. The field "PER_1" records a reference value of PER associated with the first antenna pattern. The content of fields "SINR_2", "SINR_3", "IFS_2", "IFS_3", "RSSI_2", "RSSI_3", "PER_2", "PER_3" can be deduced by analogy, where "2" represents the second antenna pattern and "3" represents the third antenna pattern. It should be noted that information recorded in the database 217 may be associated with more than three antenna patterns to achieve a finer adjustment to a steering antenna 211, and the invention should not be limited thereto.

Moreover, a CPU (Central Processing Unit) module 270 can be implemented in numerous ways, such as with dedicated hardware, or with general-purpose hardware (e.g., a single processor, multiple processors or graphics processing units capable of parallel computations, or others) that is programmed using microcode or software instructions to perform relevant functions. A protocol stack module 250 interprets every data bit of a data packet of a higher layer exchanged across the networks, such as a TCP/IP (Transmission Control Protocol/Internet Protocol) layer, etc. The CPU module 270 may communicate with the WiFi module 210 via a bridge processor 230 to transmit data to a network or receive data from the network.

Figure 3:
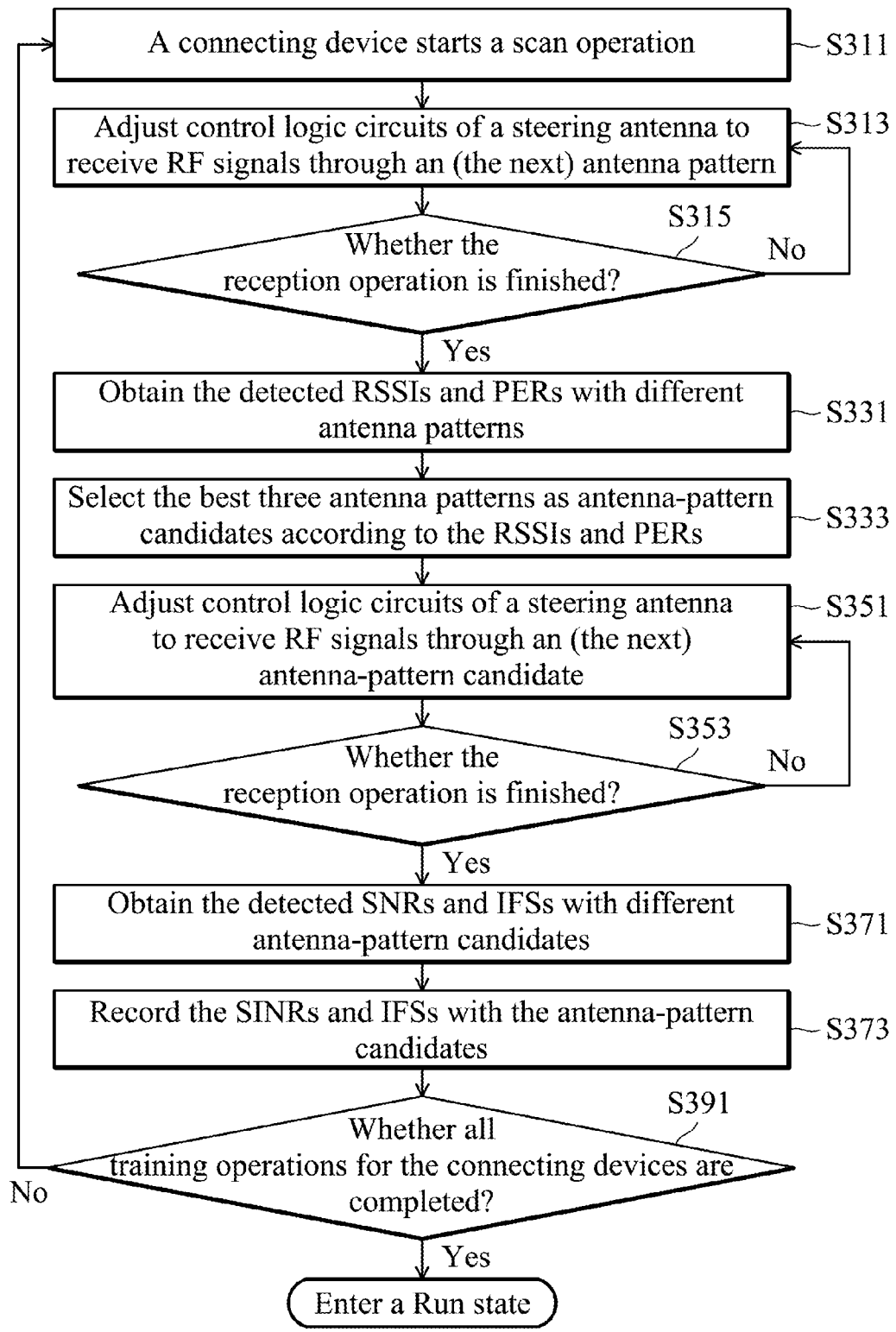
FIG. 3 is a flowchart illustrating a method for generating a database, performed by a virtual tunneling processor, according to an embodiment of the invention.

FIG. 3 is a flowchart illustrating a method for generating a database conducted by the virtual tunneling processor 216 according to an embodiment of the invention. The virtual tunneling processor 216 may contain an MCU (Microcontroller Unit) that is programmed using microcode or software instructions to perform the following functions. In other words, the method is provided to learn the extent of co-channel interference in a user environment. The method may be performed after the first time the wireless access point 111 is powered on. Subsequently, the method may be performed periodically, or when triggered by a triggering event. The method contains a periodically performed training-loop for obtaining the best three antenna patterns for each connecting device. After the connecting device starts a scan operation (step S311), the virtual tunneling processor 216 repeatedly performs a reception loop for receiving RF signals transmitted from the connecting device using different antenna patterns (steps S313 and S315). Specifically, after adjusting the control logic circuits of a steering antenna 211 via the WiFi packet driver 214 and the WiFi Tx processor 213 to receive RF signals through an antenna pattern (step S313), the virtual tunneling processor 216 determines whether the reception operation is finished (step S315). In step S315, the virtual tunneling processor 216 may determine whether the antenna patterns have all been tried. If so, the process leaves the reception loop and proceeds to step S331; otherwise, the process goes back to step S313 for enabling the virtual tunneling processor 216 to adjust the control logic circuits of the steering antenna 211 via the WiFi packet driver 214 and the WiFi Tx processor 213 to receive RF signals through the next antenna pattern. After the reception loop ends (the "Yes" path of step S315), the virtual tunneling module 216 obtains the detected RSSIs and PERs with different antenna patterns from the RF signal detector 215 (step S331) and selects the best three antenna patterns as antenna-pattern candidates according to the RSSIs and PERs (step S333). In step S333, the virtual tunneling processor 216 may store control parameters of the best three antenna patterns in the database 217, such as the fields "BP_1", "BP_2" and "BP_3" as shown in Table 2, and store the detected RSSIs and PERs with the best three antenna patterns as reference values in the database 217, such as the fields "RSSI_1", "RSSI_2", "RSSI_3", "PER_1", "PER_2" and "PER_3" as shown in Table 2. Next, another reception loop is performed repeatedly to receive RF signals transmitted from the connecting device using different antenna-pattern candidates (steps S351 and S353). Specifically, after adjusting the control logic circuits of a steering antenna 211 via the WiFi packet driver 214 and the WiFi Tx processor 213 to receive RF signals through an antenna-pattern candidate (step S351), the virtual tunneling processor 216 determines whether the reception operation is finished (step S353). In step S353, the virtual tunneling processor 216 may determine whether antenna-pattern candidates have all been tried. If so, the process leaves from the reception loop and proceeds to step S371; otherwise, the process goes back to step S351 for enabling the virtual tunneling processor 216 to adjust the control logic circuits of the steering antenna 211 via the WiFi packet driver 214 and the WiFi Tx processor 213 to receive RF signals through the next antenna-pattern candidate. After the reception loop ends (the "Yes" path of step S353), the virtual tunneling module 216 obtains the detected SNRs and IFSs with different antenna-pattern candidates from the RF signal detector 215 (step S371) and records the SINRs and IFSs with the antenna-pattern candidates (steps S373). In step S373, the virtual tunneling processor 216 may store the detected IFSs of the three antenna-pattern candidates as reference values in the database 217, such as the fields "IFS_1", "IFS_2" and "IFS_3" as shown in Table 2, and store the detected SINRs with the three antenna-pattern candidates as reference values in the database 217, such as the fields "SINR_1", "SINR_2" and "SINR_3" as shown in Table 2. Finally, in the last step 391, determining whether all training-operations for the connecting devices are completed (step S391). If so, the wireless access point 111 enters a Run state; otherwise, the process goes back to step S311 to continue another training operation for the next connecting device.

Figure 4:
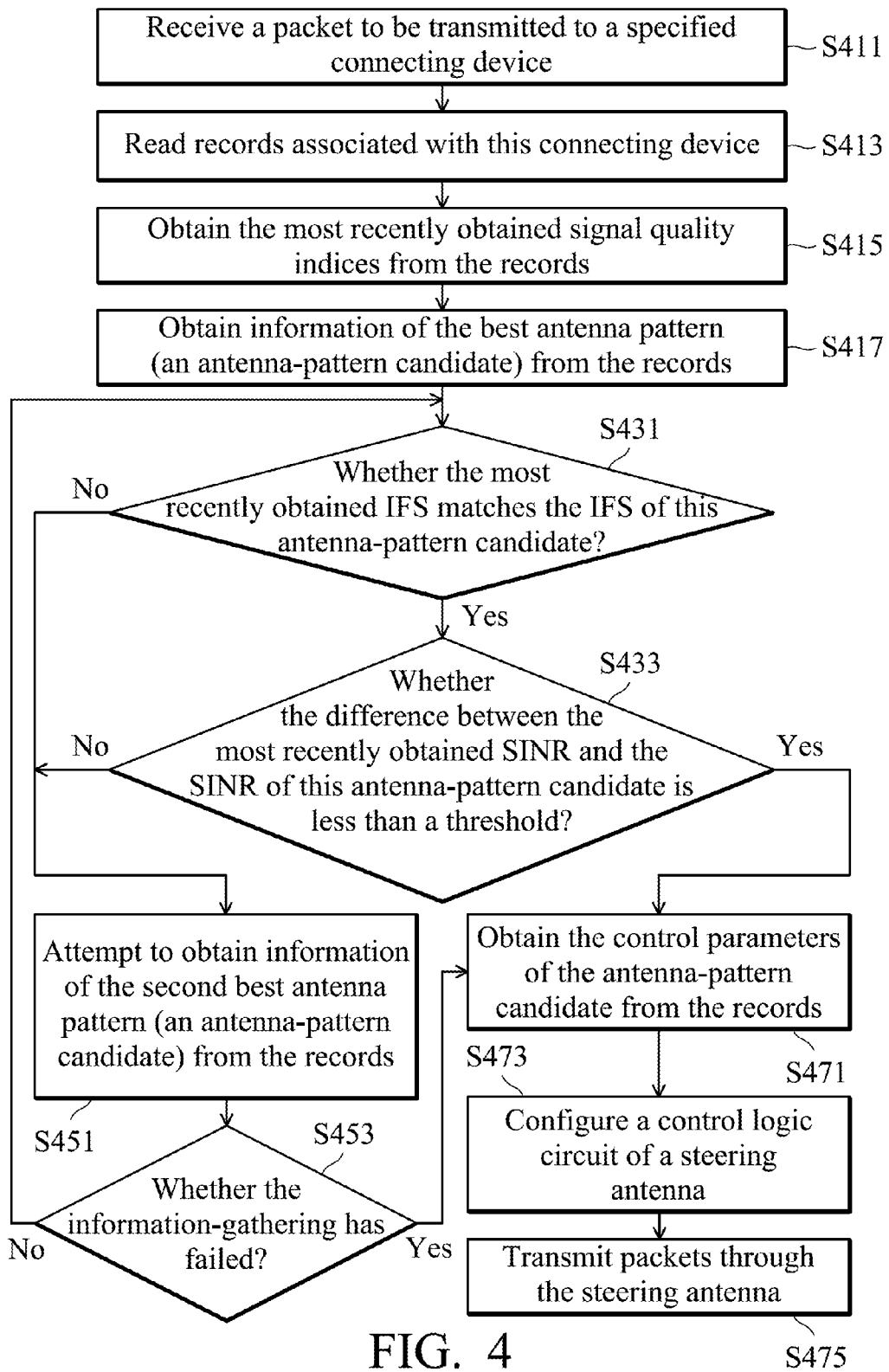
FIG. 4 is a flowchart illustrating a method for transmitting packets, performed by a virtual tunneling processor, according to an embodiment of the invention.
Figure 5:
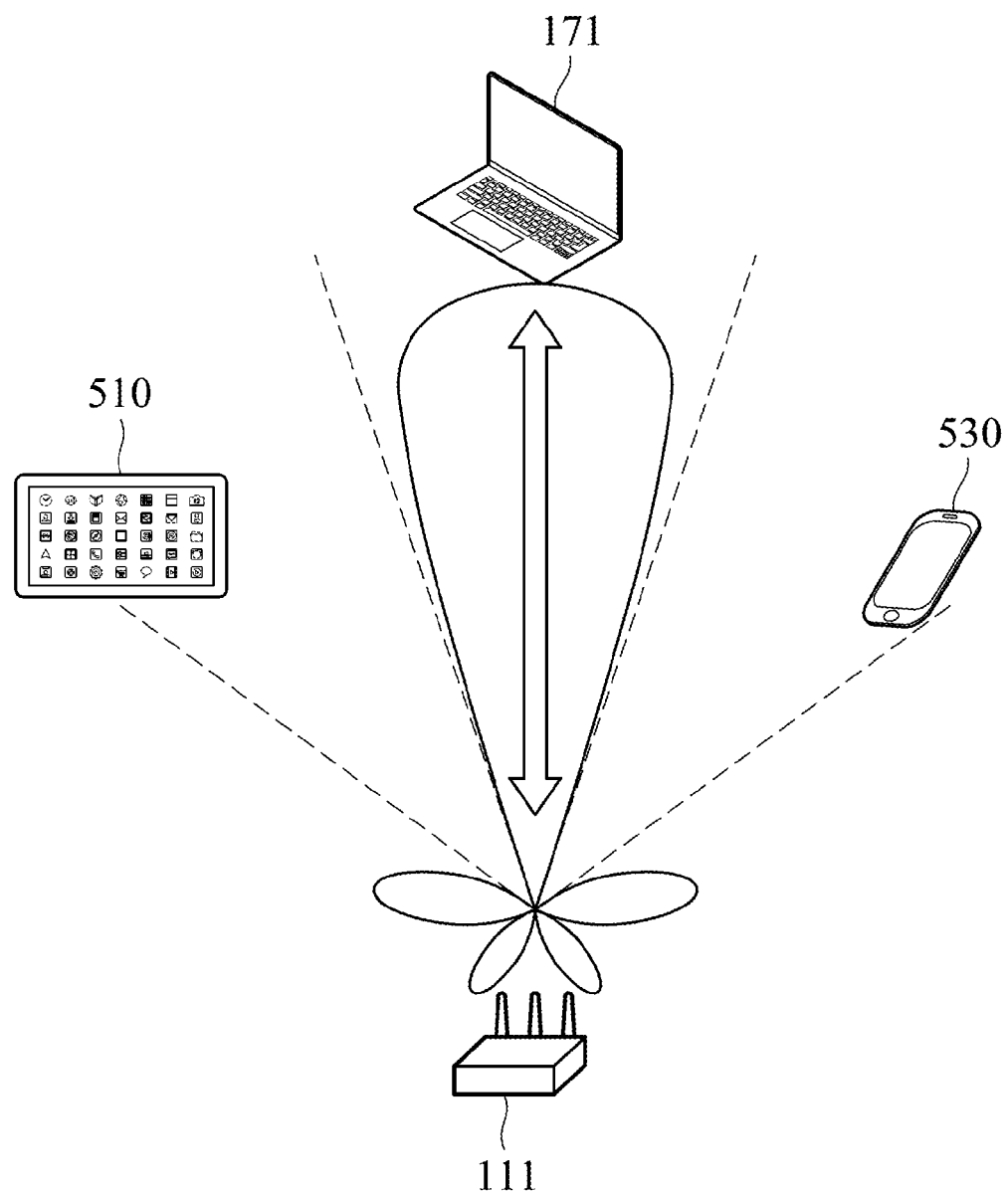
FIG. 5 is a schematic diagram illustrating a signal field according to an embodiment of the invention.

FIG. 4 is a flowchart illustrating a method for transmitting packets conducted by the virtual tunneling processor 216 according to an embodiment of the invention. After receiving a packet to be transmitted to a specified connecting device from the bridge processor 230 (step S411), the virtual tunneling processor 216 reads records associated with this connecting device (step S413). The virtual tunneling processor 216 then obtains the most recently obtained signal quality indices from the records (step S415) and information regarding the best antenna pattern from the records, where the best antenna pattern is considered as an antenna-pattern candidate (step S417). For example, assuming that the MAC address of the designated device is "MAC1": The virtual tunneling processor 216 reads all records of, for example, Table 1 and Table 2 associated with "MAC1" from the database 217 (step S413), obtains the most recently obtained signal quality indices "SINR_cur", "IFS_cur", "RSSI_cur" and "PER_cur" from the records (step S415) and obtains information of the best antenna pattern "BP_1", "SINR_1", "IFS_1", "RSSI_1" and "PER_1" from the records (step S417). Then, the virtual tunneling processor 216 a determination will be made based on the two following criteria: whether the most recently obtained IFS matches the IFS of this antenna-pattern candidate (step S431); and whether the difference between the most recently obtained SINR and the SINR of this antenna-pattern candidate is less than a threshold (step S433). When any of the aforementioned criteria has not been satisfied (the "No" path of step S431 or the "No" path of step S433), the virtual tunneling processor 216 attempts to obtain information of the second best antenna pattern from the records, where the second-best antenna pattern is considered as an antenna-pattern candidate to be chosen (step S451). This process may be modified by those skilled in the art to skip and to only perform one of the determinations mentioned in steps S431 and S433 in terms of efficiency. Next, determining whether the information-gathering has failed (step S453). If so, the virtual tunneling processor 216 configures the steering antenna 211 according to the last antenna-pattern candidate and transmits packets (steps S471 to S475); otherwise, the virtual tunneling processor 216 continues a determination for a new antenna-pattern candidate (step S431). When the aforementioned two criteria are satisfied (the "Yes" path of step S433), the virtual tunneling processor 216 obtains the control parameters of the antenna-pattern candidate from the records (step S471), configures the control logic circuits of the steering antenna 211 via the WiFi packet driver 214 and the WiFi Tx processor 213 according to the control parameters of the antenna-pattern candidate (step S473), and directs the WiFi packet driver 214 and the WiFi Tx processor 213 to transmit packets through the steering antenna 211 (step S475). For example, when the latest signal quality indices and the information of the best antenna pattern obtained satisfy the aforementioned two criteria, the virtual tunneling processor 216 configures the control logic circuits of the steering antenna 211 via the WiFi packet driver 214 and the WiFi Tx processor 213 according to the control parameters "BP_1". FIG. 5 is a schematic diagram illustrating a signal field according to an embodiment of the invention. For example, when the virtual tunneling processor 216 transmits packets to the notebook computer 171, the energy of the RF signals emitted by the steering antenna 211 is concentrated to the notebook computer 171 to generate a beamforming field, resulting in null-beam fields being formed on both sides of the beamforming field to avoid co-channel interferences with the adjacent tablet computer 510 and the mobile phone 530. With the aforementioned beamforming field, a virtual wired tunneling can be established between the wireless access point 111 and the notebook computer 171.

Although the embodiments describe WiFi examples, the invention can be applied to other wireless communications technology, such as GSM (Global System for Mobile Communications), GPRS (General Packet Radio Service), WCDMA (Wideband Code Division Multiple Access), CDMA2000, TD-SCDMA (Time Division-Synchronous CDMA), LTE (Long Term Evolution), TD-LTE (Time Division-Long Term Evolution), Bluetooth, ZigBee, etc. Although the embodiments have been described as having specific elements in FIG. 2, it should be noted that additional elements may be included to achieve better performance without departing from the spirit of the invention. While the process flows described in FIGS. 3 and 4 each include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for controlling antennas performed by a virtual tunneling processor of a wireless access point, the method comprising the following steps:
    obtaining a plurality of first signal quality indices associated with a connecting device by respectively detecting the plurality of first signal quality indices by a plurality of antenna patterns;
    selecting a plurality of best antenna patterns as a plurality of antenna-pattern candidates according to the first signal quality indices;
    obtaining a plurality of second signal quality indices associated with the connecting device by respectively detecting the plurality of second signal quality indices by the antenna-pattern candidates; and
    transmitting the second signal quality indices to a database,
    wherein the second signal quality indices are SINRs (Signal-to-Interference-plus-Noise Ratios) or IFSs (Interframe Spaces).

2. The method of claim 1, wherein the first signal quality indices are RSSIs (Received Signal Strength Indications) or PERs (Packet Error Rates).

3. The method of claim 1, further comprising:
    storing the first signal quality indices associated with the connecting device in the database, wherein the first signal quality indices are detected under respective antenna patterns.

4. The method of claim 1, wherein the step for obtaining a plurality of first signal quality indices associated with the connecting device by respectively detecting the plurality of first signal quality indices by a plurality of antenna patterns, further comprises:
    repeatedly performing a first loop, wherein, in each run, a control logic circuit of a steering antenna is adjusted to receive RF (Radio Frequency) signals transmitted from the connecting device by one of the plurality of antenna patterns, in order to obtain one of the first signal quality indices.

5. The method of claim 4, wherein the step for obtaining a plurality of second signal quality indices associated with the connecting device by respectively detecting the plurality of second signal quality indices by the antenna-pattern candidates, further comprises:
    repeatedly performing a second loop, wherein, in each run, the control logic circuit of the steering antenna is adjusted to receive RF signals transmitted from the connecting device by one of the plurality of antenna-pattern candidates in order to obtain one of the plurality of second signal quality indices.

6. A method for controlling antennas performed by a virtual tunneling processor of a wireless access point, the method comprising the following steps:
    receiving a packet to be transmitted to a connecting device;
    providing a database, wherein the database stores a plurality of most recently obtained first signal quality indices associated with the connecting device and a plurality of second signal quality indices of a plurality of the best antenna patterns associated with the connecting device;
    selecting one of the plurality of the best antenna pattern by comparing the first signal quality indices with the second signal quality indices; and
    adjusting a control logic circuit of a steering antenna for the selected antenna pattern to transmit the packet to the connecting device,
    wherein the second signal quality indices comprise a plurality of IFSs, or a plurality of SINRs, or a combination thereof.

7. The method of claim 6, wherein the steering antenna transmits the packet to generate a beamforming field and form null-beam fields on both sides of the beamforming field to avoid co-channel interference with surrounding devices other than the connecting device.

8. The method of claim 6, wherein the first signal quality indices comprise a first IFS (Interframe Space), and the first IFS matches one of the plurality of IFSs of the second signal quality indices.

9. The method of claim 6, wherein the first signal quality indices comprise a first SINR (Signal-to-Interference-plus-Noise Ratio), and wherein the difference between the first SINR and the SINR of the second signal quality indices is less than a threshold.

10. The method of claim 6, wherein the first signal quality indices comprise a first IFS (Interframe Space) and a first SINR (Signal-to-Interference-plus-Noise Ratio), and the first IFS matches the IFS of the second signal quality indices, and wherein the difference between the first SINR and the SINR of the second signal quality indices is less than a threshold value.

11. An apparatus for controlling antennas, comprising:
    a database; and
    a virtual tunneling processor coupled to the database, obtaining a plurality of first signal quality indices associated with a connecting device respectively detected by a plurality of antenna patterns, selecting a plurality of the best antenna patterns as a plurality of antenna-pattern candidates according to the first signal quality indices, obtaining a plurality of second signal quality indices associated with the connecting device respectively detected by the antenna-pattern candidates, and transmitting the second signal quality indices to the database, wherein the second signal quality indices are SINRs (Signal-to-Interference-plus-Noise Ratios), or IFSs (Interframe Spaces), or a combination thereof.

12. The apparatus of claim 11, wherein the first signal quality indices are RSSIs (Received Signal Strength Indications) or PERs (Packet Error Rates).

13. The apparatus of claim 11, wherein the virtual tunneling processor stores the first signal quality indices associated with the connecting device in the database, wherein the first signal quality indices are detected under each of the plurality of antenna patterns.

14. The apparatus of claim 11, further comprising:

a steering antenna coupled to the virtual tunneling processor, wherein the virtual tunneling processor repeatedly performs a first loop, wherein, in each run, the virtual tunneling processor adjusts a control logic circuit of the steering antenna to receive RF (Radio Frequency) signals transmitted from the connecting device with one of the plurality of antenna patterns in order to obtain one of the first signal quality indices.

15. The apparatus of claim 14, wherein the virtual tunneling processor repeatedly performs a second loop, wherein, in each run, the virtual tunneling processor adjusts the control logic circuit of the steering antenna to receive RF signals transmitted from the connecting device by one of the antenna-pattern candidates in order to obtain one of the second signal quality indices.

16. The apparatus of claim 14, wherein the steering antenna transmits the packet to generate a beamforming field and form null-beam fields on both sides of the beamforming field to avoid co-channel interference with surrounding devices other than the connecting device.

17. The apparatus of claim 14, wherein the first signal quality indices comprise a first IFS (Interframe Space), and the first IFS matches an IFS of a selected antenna pattern selected based on by comparing the first signal quality indices with the second signal quality indices.

18. The apparatus of claim 14, wherein the first signal quality indices comprise a first SINR (Signal-to-Interference-plus-Noise Ratio), and the difference between the first SINR and an SINR of a selected antenna pattern selected based on by comparing the first signal quality indices with the second signal quality indices is less than a threshold value.

19. The apparatus of claim 14, wherein the first signal quality indices comprise a first IFS (Interframe Space) and a first SINR (Signal-to-Interference-plus-Noise Ratio), the first IFS matches an IFS of a selected antenna pattern selected based on by comparing the first signal quality indices with the second signal quality indices, and wherein the difference between the first SINR and an SINR of the selected antenna pattern is less than a threshold value.

* * * * *